United States Patent
Coutu et al.

(10) Patent No.: US 10,927,958 B2
(45) Date of Patent: Feb. 23, 2021

(54) NON-AXISYMMETRIC BRUSH SEAL ASSEMBLY

(71) Applicant: PRATT & WHITNEY CANADA CORP., Longueuil (CA)

(72) Inventors: Daniel Coutu, Longueuil (CA); Ignatius Theratil, Mississauga (CA); Nicola Houle, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 157 days.

(21) Appl. No.: 16/127,714

(22) Filed: Sep. 11, 2018

(65) Prior Publication Data

US 2020/0080645 A1 Mar. 12, 2020

(51) Int. Cl.
*F16J 15/3288* (2016.01)
(52) U.S. Cl.
CPC .................. *F16J 15/3288* (2013.01)
(58) Field of Classification Search
CPC .................................................. F16J 15/3288
See application file for complete search history.

(56) References Cited

U.S. PATENT DOCUMENTS

| | | | |
|---|---|---|---|
| 9,784,371 B2 | 10/2017 | Franceschini et al. | |
| 2003/0151206 A1* | 8/2003 | Smith | A46B 5/06 277/355 |
| 2011/0049810 A1* | 3/2011 | Ferryman | F28D 19/047 277/355 |
| 2013/0313782 A1* | 11/2013 | Jahn | F16J 15/3288 277/309 |
| 2015/0014939 A1* | 1/2015 | Inoue | F16J 15/3288 277/355 |
| 2015/0354707 A1* | 12/2015 | Inoue | F16J 15/3288 277/355 |
| 2016/0003385 A1* | 1/2016 | Koves | F16L 23/20 277/611 |
| 2018/0142565 A1 | 5/2018 | Theratil et al. | |

\* cited by examiner

*Primary Examiner* — Gilbert Y Lee
(74) *Attorney, Agent, or Firm* — Norton Rose Fulbright Canada LLP

(57) ABSTRACT

There is disclosed a brush seal assembly including at least one annular bristle pack. The at least one annular bristle pack extends circumferentially around a central axis of the brush seal assembly. The at least one annular bristle pack has bristles extending along longitudinal axes from roots to free tips. The bristles extend toward a cylindrical plane of a the seal land. Projections of the free tips on the cylindrical plane define a bristle tip projection surface being non-axisymmetric. A method of operating a brush seal assembly is also disclosed.

20 Claims, 3 Drawing Sheets

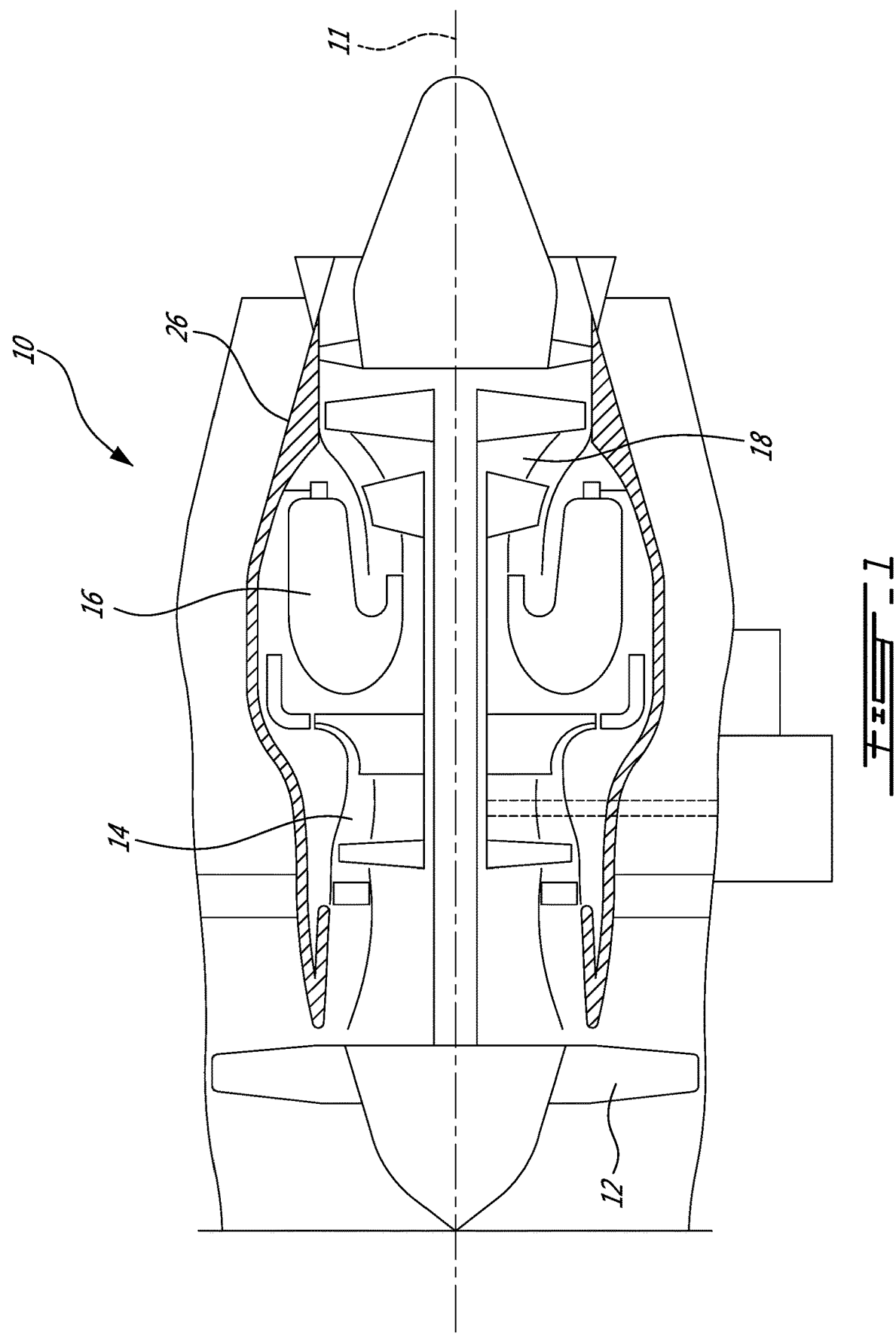

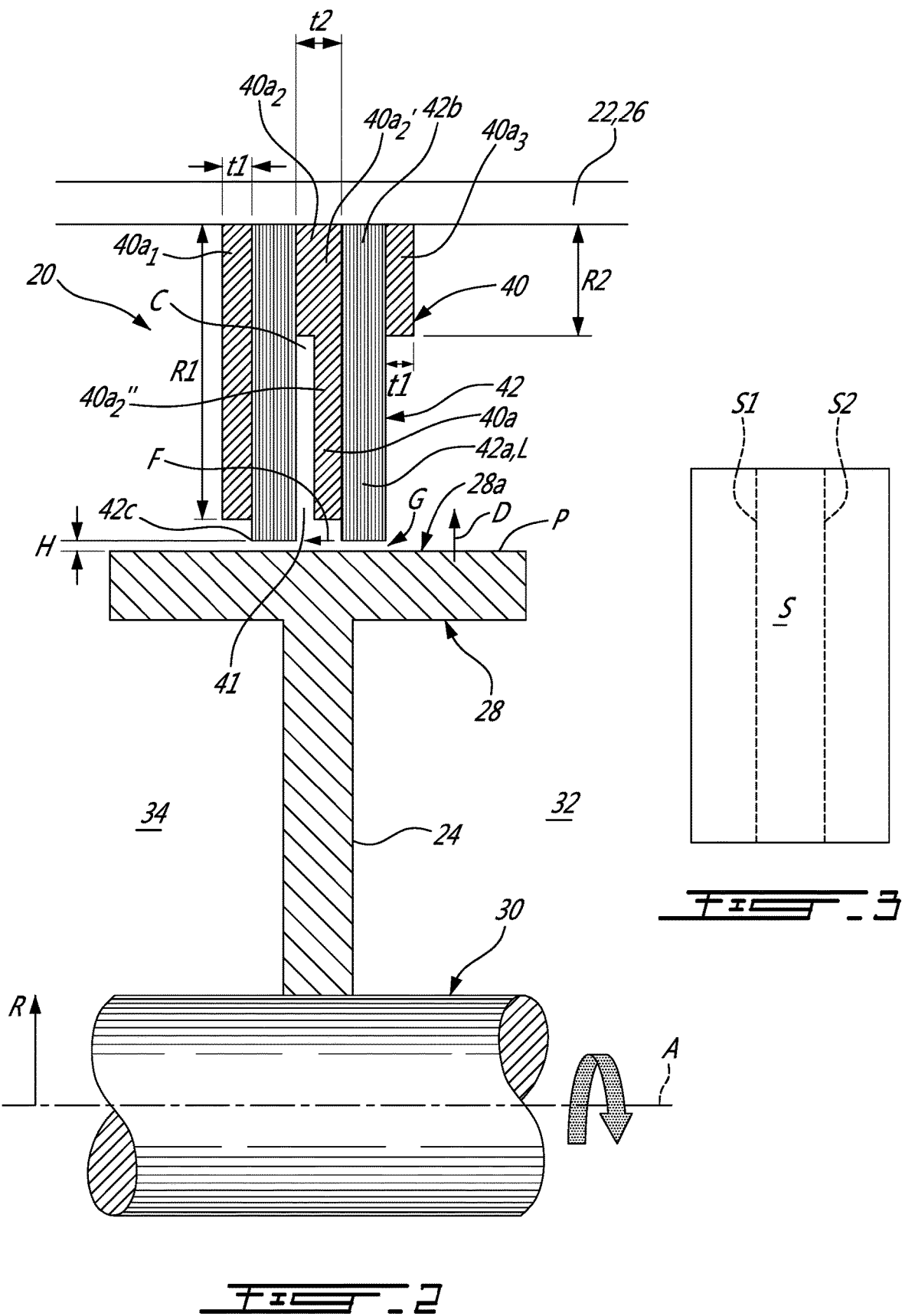

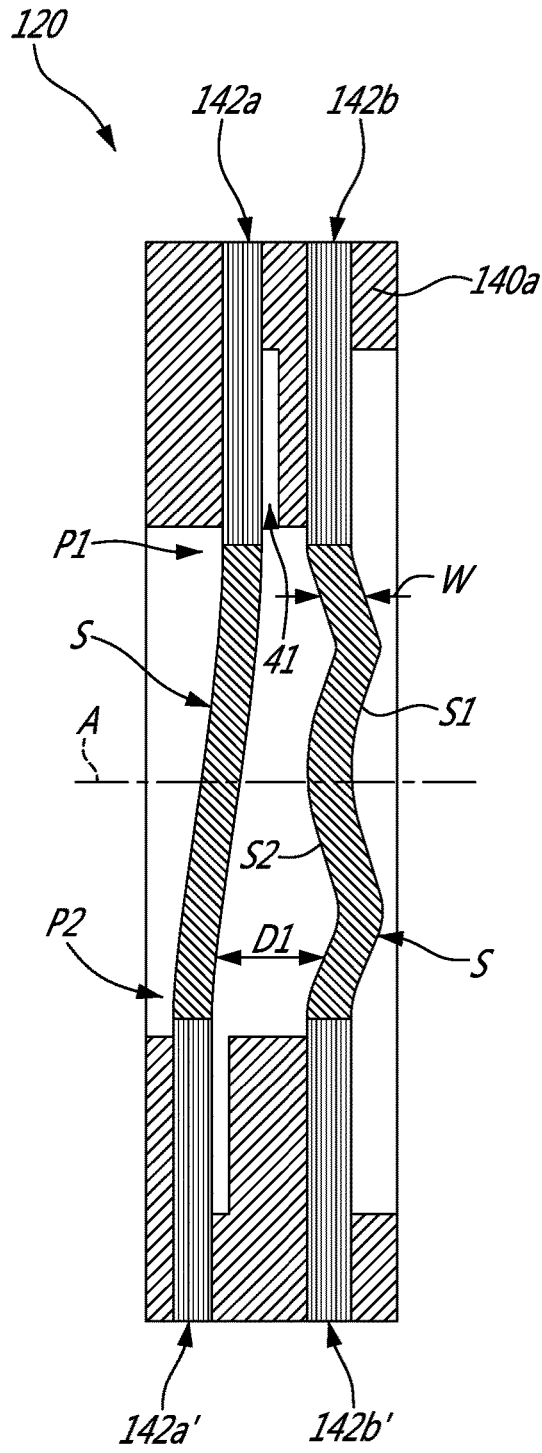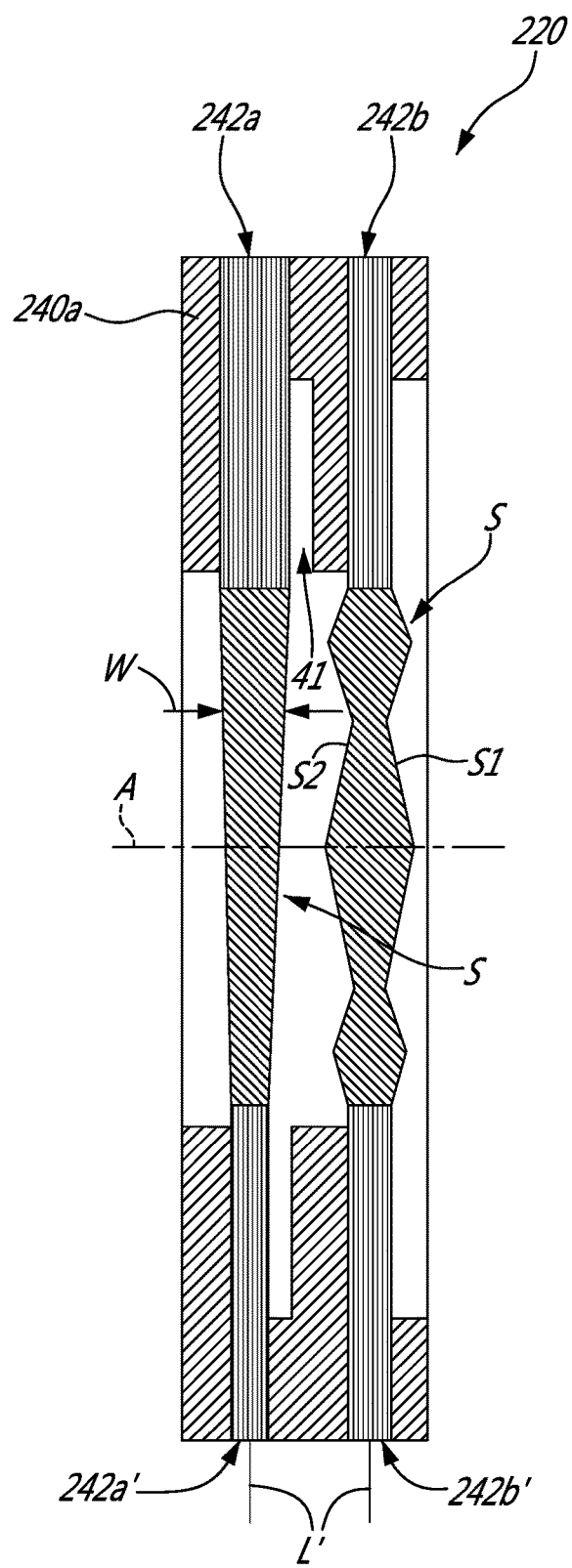

NON-AXISYMMETRIC BRUSH SEAL ASSEMBLY

TECHNICAL FIELD

The application relates generally to gas turbine engines and, more particularly, to brush seals used in such engines for sealing a gap between two parts that move relative to one another.

BACKGROUND OF THE ART

Brush seals are commonly used in gas turbine engines but are typically not intended to completely seal different engine sections from one another. Brush seals rely on the limited flow path created between bristles of bristle packs to reduce the air flow from one part of the engine to another to control the pressure drop between the parts.

Such brush seals are for example used in thrust pistons used to balance the heavy forces present in gas turbine engines. Compressed air is directed against the thrust piston to counter act the force created by the engine.

SUMMARY

In one aspect, there is provided a brush seal assembly comprising at least one annular bristle pack extending circumferentially around a central axis of the seal, the at least one annular bristle pack having bristles extending along longitudinal axes from roots to free tips, the bristles extending toward a cylindrical plane of a seal land, projections of the free tips on the cylindrical plane defining a bristle tip projection surface that is non-axisymmetric relative to the central axis.

In another aspect, there is provided a gas turbine engine comprising a casing, a seal runner for rotation about a central axis, and a brush seal assembly operatively mounted between the casing and the seal runner to be secured to one of the casing and the seal runner, the brush seal assembly including at least one bristle pack, the at least one bristle pack being annular and extending circumferentially around the central axis, the at least one bristle pack having bristles extending from roots to free tips, the free tips of the bristles facing a seal land located on the other of the casing and the seal runner, a projection of the free tips of the bristles on the seal land along a direction normal to the seal land defining a bristle tip projection surface that circumferentially extends around the axis, the bristle tip projection surface being non-axisymmetric.

In yet another aspect, there is provided a method of operating a brush seal assembly located between a stator and a rotor of a component of a gas turbine engine, comprising: separating a first zone from a second zone by a bristle pack of the brush seal assembly secured to one of the stator and the rotor, the first zone being at a higher pressure than the second zone; permitting a fluid to flow from the first zone to the second zone via a gap circumferentially extending around a central axis of the brush seal assembly and defined between tips of the bristles and a seal land of the other of the stator and the rotor; and varying at least one of a position and a width of the gap relative to the seal land along a circumference of the gap.

DESCRIPTION OF THE DRAWINGS

Reference is now made to the accompanying figures in which:

FIG. 1 is a schematic cross-sectional view of a gas turbine engine;

FIG. 2 is a schematic cross-sectional view of a portion of the gas turbine engine of FIG. 1 including a brush seal assembly in accordance with one embodiment cooperating with a rear seal runner;

FIG. 3 is a schematic top view of the rear seal runner of FIG. 2;

FIG. 4 is a schematic cross-sectional view of a brush seal assembly in accordance with another embodiment; and FIG. 5 is a schematic cross-sectional view of a brush seal assembly in accordance with yet another embodiment.

DETAILED DESCRIPTION

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14 and the turbine section 18 are in rotation about an axis 11 of the gas turbine engine 10.

FIG. 2 illustrates a cross-sectional view of a portion of the gas turbine engine 10 near the turbine section 18. A brush seal assembly 20 is adapted to be operatively mounted between a stator 22 and a rotor 24 of the gas turbine engine 10. The stator 22 may be part of or may be secured to a casing 26 of the gas turbine engine 10 and the rotor 24 may include a rear seal runner 28 secured to a shaft 30 of the gas turbine engine 10. The rear seal runner 28 may also be referred to as a balance thrust piston.

The brush seal assembly 20 may be used to control a pressure differential or to maintain a generally constant pressure differential between a first zone 32 and a second zone 34 axially separated from the first zone 32 by the rear seal runner 28. The pressure in the first zone 32 may be higher than that in the second zone 34 thereby creating a force on the rear seal runner 28 in a direction opposite to a direction of the combustion gases so that a ball bearing (not shown) may always be axially loaded. It is understood that the brush seal assembly 20 may be mounted between a stator or a rotor of a compressor 14 of the gas turbine engine 10 or any other component including a rotor and a stator. The brush seal assembly 20 may be secured to the rotor 24 or to the stator 22. In the depicted embodiment, the brush seal assembly 20 is secured to the stator 22 corresponding herein to the engine casing 26.

The brush seal assembly 20 may include a housing 40 (a.k.a., a brush seal support) and at least one bristle pack 42, e.g., two in the depicted embodiment, secured to the housing 40. The housing 40 and the at least one bristle pack 42 are annular and circumferentially extend around a central axis A thereof and along a full circumference thereof. As shown, the housing 40 of the brush seal assembly 20 may be secured to the engine casing 26.

In the depicted embodiment, the housing 40 includes annular members 40a axially spaced from each other and adapted to receive the bristle packs 42 therebetween. The annular members 40a and the bristle packs 42 may be made of Inconel™. Such a material may be required depending of the operating conditions to which the brush seal assembly 20 is submitted. In one embodiment, the rear seal runner 28 is downstream of the combustor 16. Accordingly, it may be subjected to temperatures neighbouring 600° F. and up to 1200° F. or higher. Any other suitable material may be used provided such material can sustain the operating conditions of the gas turbine engine 10.

The bristle packs 42 may be embedded within the housing 40. As shown, each of the bristle packs 42 is axially bound by two annular members 40a. The annular members 40a may also be referred to as annular washers. The brush seal assembly 20 may include a stack of annular members 40a and bristle packs 42 disposed in alternation with the annular members 40a. Accordingly, more than two bristle packs 42 may be provided by adding more annular members 40a. The members 40a are thus adapted to sandwich the bristle packs 42 therebetween. In the illustrated embodiment, the brush seal assembly 20 has two bristle packs 42 and three annular members 40a defining an annular cavity C between the two packs 42. Other arrangements are considered to support the bristles in the annular configuration, such as an embedding in a single annular housing 40, etc. The annular members 40a might provide support to the bristle packs 42 against an axial force resulting from the pressure differential between zones 32 and 34. The dimensions of the annular members 40a and of the bristle packs 42 are function of a rotational speed of the rotor, the pressure differential between the zones 32 and 34, a temperature in which they are operated, a size of the seal runner, etc.

In the depicted embodiment, the annular members 40a include an aft member $40a_1$, a middle member $40a_2$ and a fore member $40a_3$. As shown, the aft member and the fore member $40a_1$, $40a_3$ have a same thickness t1 taken along the central axis A. The aft member $40a_1$ has a radial height R1 taken along a radial direction R relative to the central axis A that may be greater than a radial height R2 of the fore member $40a_3$. The radial height R1 of the aft member $40a_1$ may correspond to that of the middle member $40a_2$. The middle member $40a_2$ has an outward portion $40a_2'$ and an inward portion $40a_2''$ located radially inwardly to the outward portion $40a_2'$ relative to the central axis A. A thickness t2 of the middle member $40a_2$ at the outward portion $40a_2'$ may be greater than the thickness t1 of the aft and fore members $40a_1$, $40a_3$. The thickness t1 of the fore member $40a_1$ may correspond to that of the middle member $40a_2$ at the inward portion $40a_2''$. A difference in the thicknesses between the outward and inward portions $40a_2'$, $40a_2''$ of the middle member $40a_2$ creates a spacing 41 such that a portion of length of the bristles 42a of one of the bristle packs 42 is axially spaced apart from the middle member $40a_2$. The spacing 41 might allow the bristles to be less constrained and to be exposed to the pressure load in order to move radially towards the rotor seal land 28a to increase a sealing effect. This is referred to as the "pressure closure" of "blow down" phenomenon. The radial height R2 of the fore member $40a_3$ may correspond to that of the outward portion $40a_2'$ of the middle member $40a_2$. In the embodiment shown, a thickness of the spacing 41 between the middle member inward portion $40a_2''$ and one of the bristle packs 42 is constant along its circumference.

Each of the two bristle packs 42 includes bristles 42a that extend along longitudinal axes L from roots 42b to free tips 42c opposed to the roots 42b. The longitudinal axes L may be generally parallel to the radial direction R relative to the central axis A, though with deflections from parallel being possible due to the flexible nature of the bristles 42a. The roots 42b are secured to the housing 40 whereas the free tips 42c are cantilevered. A sealing effect is provided at least by a cooperation of the free tips 42c of the bristles 42a and a seal land 28a located on the rear seal runner 28. The rotor seal land 28a is defined as a zone on the rotor that faces the tips 42c of the bristles 42a of the bristle pack 42.

In the embodiment shown, the free tips 42c of the bristles 42a and the seal land 28a may or may not be spaced from each other by a gap G. The seal land 28a corresponds to a portion of the seal runner 28 that is aligned with the gap G. In the depicted embodiment, the seal land 28a extends circumferentially around the central axis A and axially; the gap G having a height H defined along the radial direction R relative to the central axis A. It is understood that, alternatively, the seal land 28a may extend radially such that the height H of the gap G is defined along the central axis A without departing from the scope of the present disclosure. Other configurations are contemplated.

Referring now to FIGS. 2-3, the bristles 42a extend along their longitudinal axes L toward a plane P, a cylindrical plane in the depicted embodiment, that contains the seal land 28a. A bristle tip projection surface S is defined on the cylindrical plane P and on the seal land 28a by projections (e.g., imaginary) of the free tips 42c of the bristles 42a on the plane P. The projections of the free tips 42c may be along the longitudinal axes L or along a direction D normal to the seal land 28a. The bristle tip projection surface S corresponds to a surface on the seal land 28a that cooperates with the bristle free tips 42c in providing at least partially the sealing effect. Stated differently, portions of the seal land 28a that do not face the bristle free tips 42c are outside of the bristle tip projection surface S. As shown, the bristle tip projection surface S extends from a first limit S1 to a second limit S2 being shown in dashed lines in FIG. 3. The first and second limits S1, S2 extend circumferentially around the central axis A. The gap G is contained between first limit S1 and the second limit S2. In the depicted embodiment, the first limit S1 is axially spaced apart from the second limit S2 relative to the central axis A.

It has been observed that a flow of air F circulating via the gap G might produce flutter. The flutter is an aerodynamic phenomenon characterized by a fluid-structure interaction. More specifically, aerodynamic forces created by the flow of air F circulating via the gap G combined with the natural vibration frequency of the rear seal runner 28 might create self-feeding vibrations. The flutter and the associated self-feeding vibrations may be detrimental to the structural integrity of the rear seal runner 28. Overtime, cracks may develop and result in the failure of the rear seal runner 28.

To at least partially decrease a magnitude of the flutter, it might be advantageous to design the brush seal assembly 20 such that the bristle tip projection surface S defined by the bristle pack 42 is non-axisymmetric.

A plurality of designs of the bristle packs 42 that would generate a bristle tip projection surface S being non-axisymmetric are possible. A few possible embodiments are described herein below with reference to FIGS. 4-5. The scope of the present disclosure should not be limited thereby.

Referring now to FIG. 4, as shown, the brush seal assembly 120 includes two bristle packs 142a, 142b that are described below. The bristle tip projection surfaces S created by both of the two bristle packs 142a, 142b have a width W that is constant along their circumference. Herein, the width W is defined as a distance between the first and second limits S1, S2. In the embodiment shown, the width W is taken along the axial direction. An aft one of the two bristle packs, referred to below as the aft bristle pack 142a, and a fore one of the two bristle packs, or fore bristle pack 142b, are described below. The bristle tip projection surfaces S created by the aft and fore bristle packs 142a, 142b are non-axisymmetric. In the depicted embodiment, a distance D1 between the two bristle tip projection surfaces S of the fore and aft bristle packs 142a, 142b varies along the circumference. In a particular embodiment, a distance between the bristle tip projection surfaces of the fore and aft bristle packs may be constant along a circumference of the brush seal assembly 120.

In the depicted embodiment, a position of the bristle tip projection surface S of the aft bristle pack 142a varies monotonically between a first position P1 and a second position P2 along one of two equal halves 142a' of the aft bristle pack 142a. In the depicted embodiment, the first and second positions P1, P2 are axially spaced apart from each other relative to the central axis A. In the embodiment shown, the bristle tip projection surface S reaches the first position P1 at a first circumferential position and reaches the second position P2 at a second circumferential position being diametrically opposed to the first circumferential position. For a first one of two equal halves 142a' of the aft bristle pack 142a, the position of the bristle tip projection surface moves monotonically from the first position P1 at the first circumferential position to the second position P2 at the second circumferential position. And, for a second one of the two equal halves 142a' of the aft bristle pack 142a, the position of the bristle tip projection surface S moves monotonically from the second position P2 at the second circumferential position to the first position P1 at the first circumferential position.

A position of the bristle tip projection surface S of the fore bristle pack 142b moves along its circumference in an alternating manner. Stated otherwise, the position of the bristle tip projection surface S moves in alternation in opposed directions along both of two equal halves 142b' of the fore bristle pack 142b.

Referring now to FIG. 5, as shown, the brush seal assembly 220 includes two bristle packs 242a, 242b that are described below. The bristle tip projection surfaces S created by both of the two bristle packs 242a, 242b have a width W that varies along their circumference. An aft one of the two bristle packs, referred to below as the aft bristle pack 242a, and a rear one of the two bristle packs, or rear bristle pack 242b, are described below. The bristle tip projection surfaces S created by the aft and fore bristle packs 242a, 242b are non-axisymmetric. In the depicted embodiment, the bristle tip projection surfaces S created by the fore and aft bristle packs 242a, 242b are each symmetric about center lines L' located between the first and second limits S1, S2.

In the depicted embodiment, the width W of the bristle tip projection surface of the aft bristle pack 242a varies monotonically between a maximal value and a minimal value along half of the circumference of the aft bristle pack 242a. In the embodiment shown, the width W of the bristle tip projection surface S reaches the maximum value at a first circumferential position and reaches the minimal value at a second circumferential position being diametrically opposed to the first circumferential position. For a first one of two equal halves 242a' of the aft bristle pack 242a, the width W of the bristle tip projection surface S increases monotonically from the minimal value at the first circumferential position to the maximal value at the second circumferential position. And, for a second one of the two equal halves 242a' of the aft bristle pack 242a, the width W of the bristle tip S surface decreases monotonically from the maximum value at the second circumferential position to the minimal value at the first circumferential position.

A width W of the bristle tip projection surface of the fore bristle pack 242b varies along its circumference in an alternating manner. Stated otherwise, the width W of the bristle tip projection surface S alternately increases and decreases along both of two equal halves 242b' of the fore bristle pack 242.

In a particular embodiment, having a brush seal assembly with two different bristle packs may prevent an aero-structural coupling. From an acoustic point of view, having two different bristle packs may cause a volume of the annular cavity C between the two bristle packs to be non-uniform (i.e., non-axisymmetric) through its circumference so that the annular cavity C might act as an acoustic wave disrupter.

It is understood that a brush seal assembly may include only one, two, or more than two of the disclosed bristle packs. A brush seal assembly may include any combinations of the disclosed bristle packs without departing from the scope of the present disclosure. The bristle packs of a brush seal assembly may be identical to each other or different from one another.

In the embodiment shown, a total thickness of the brush seal assembly is constant along its circumference; thicknesses of annular members 140a, 240a varying along their circumference to accommodate fluctuations in the position and/or the width W of the bristle packs 142a, 142b, 242a, 242b.

For operating the brush seal assembly 20, the first zone 32 is separated from the second zone 34 by the bristle pack 42 of the brush seal assembly 20. A fluid is permitted to flow from the first zone 32 to the second zone 34 via the gap G circumferentially extending around the central axis A and defined between the free tips 42c of the bristles 42a and the seal land 28a. At least one of a position and a width W of the gap G relative to the seal land 28a is varied along a circumference of the gap G.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A brush seal assembly comprising at least one annular bristle pack extending circumferentially around a central axis of the brush seal assembly, the at least one annular bristle pack having bristles extending along longitudinal axes from roots to free tips, the bristles extending toward a cylindrical plane of a seal land, projections of the free tips on the cylindrical plane defining a bristle tip projection surface that is non-axisymmetric relative to the central axis.

2. The brush seal assembly of claim 1, wherein a width of the bristle tip projection surface varies along a circumference of the at least one bristle pack.

3. The brush seal assembly of claim 2, wherein the width of the bristle tip projection surface alternately increases and decreases along both of two equal halves of the at least one annular bristle pack.

4. The brush seal assembly of claim 2, wherein the width of the bristle tip projection surface decreases monotonically from a maximum value to a minimum value along one of two equal halves of the at least one annular bristle pack and increases monotonically from the minimum value to the maximum value along the other of the two equal halves of the at least one annular bristle pack.

5. The brush seal assembly of claim 1, wherein a width of the bristle tip projection surface is constant along a circumference of the at least one annular bristle pack.

6. The brush seal assembly of claim 5, wherein a position of the bristle tip projection surface moves monotonically from a first position to a second position along one of two equal halves of the at least one bristle annular pack and moves monotonically from the second position to the first position along the other of the two equal halves of the at least one annular bristle pack.

7. The brush seal assembly of claim 5, wherein a position of the bristle tip projection surface moves alternately in opposite directions along both of two equal halves of the at least one annular bristle pack.

8. The brush seal assembly of claim 1, wherein the bristle tip projection surface is symmetric about a center line thereof.

9. The brush seal assembly of claim 1, wherein the at least one annular bristle pack includes two annular bristle packs spaced apart from one another, a distance between bristle tip projection surfaces of the two annular bristle packs varying along a circumference of the two bristle packs.

10. The brush seal assembly of claim 9, wherein the two annular bristle packs are different from one another.

11. A gas turbine engine comprising a casing, a seal runner for rotation about a central axis, and a brush seal assembly operatively mounted between the casing and the seal runner to be secured to one of the casing and the seal runner, the brush seal assembly including at least one bristle pack, the at least one bristle pack being annular and extending circumferentially around the central axis, the at least one bristle pack having bristles extending from roots to free tips, the free tips of the bristles facing a seal land located on the other of the casing and the seal runner, a projection of the free tips of the bristles on the seal land along a direction normal to the seal land defining a bristle tip projection surface that circumferentially extends around the axis, the bristle tip projection surface being non-axisymmetric.

12. The gas turbine engine of claim 11, wherein a width of the bristle tip projection surface varies along a circumference of the at least one bristle pack.

13. The gas turbine engine of claim 12, wherein the width of the bristle tip projection surface alternately increases and decreases along both of two equal halves of the at least one bristle pack.

14. The gas turbine engine of claim 12, wherein the width of the bristle tip projection surface decreases monotonically from a maximum value to a minimum value along one of two equal halves of the at least one bristle pack and increases monotonically from the minimum value to the maximum value along the other of the two equal halves of the at least one bristle pack.

15. The gas turbine engine of claim 11, wherein a width of the bristle tip projection surface is constant along a circumference of the at least one bristle pack.

16. The gas turbine engine of claim 15, wherein a position of the bristle tip projection surface moves monotonically from a first position to a second position along one of two equal halves of the at least one bristle pack and moves monotonically from the second position to the first position along the other of the two equal halves of the at least one bristle pack.

17. The gas turbine engine of claim 15, wherein a position of the bristle tip projection surface moves alternately in opposite directions along both of two equal halves of the at least one bristle pack.

18. The gas turbine engine of claim 11, wherein the bristle tip projection surface is symmetric about a center line thereof.

19. The gas turbine engine of claim 11, wherein the at least one bristle pack includes two bristle packs spaced apart from one another, a distance between bristle tip projection surfaces of the two bristle packs varying along a circumference of the two bristle packs.

20. A method of operating a brush seal assembly located between a stator and a rotor of a component of a gas turbine engine, comprising:
    separating a first zone from a second zone by a bristle pack of the brush seal assembly secured to one of the stator and the rotor, the bristle pack extending circumferentially around a central axis of the brush seal assembly, the first zone being at a higher pressure than the second zone;
    permitting a fluid to flow from the first zone to the second zone via a gap circumferentially extending around the central axis of the brush seal assembly and defined between tips of the bristles and a seal land of the other of the stator and the rotor; and
    varying at least one of a position and a width of the gap relative to the seal land along a circumference of the gap by having projections of the tips of the bristles on a cylindrical plane of the seal land defining a bristle tip projection surface that is non-axisymmetric relative to the central axis.

* * * * *